Jan. 6, 1970  D. A. DIXON  3,487,769
APPARATUS FOR CONTROLLED ADMISSION OF AIR
TO CONTROLLED ATMOSPHERE
Filed April 26, 1965  3 Sheets-Sheet 1
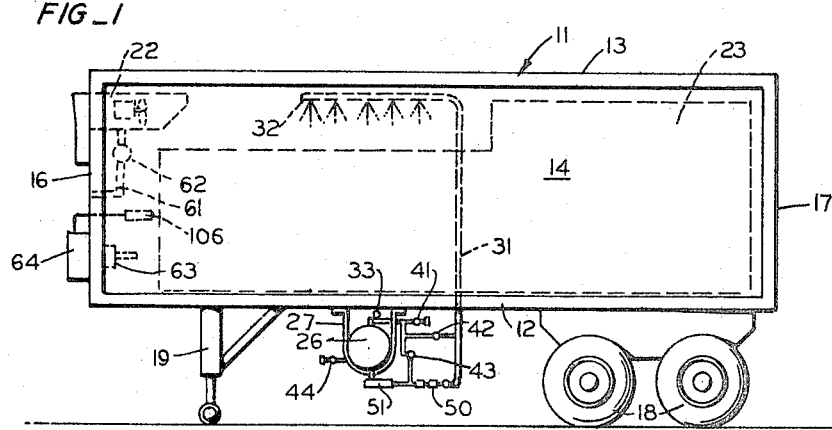
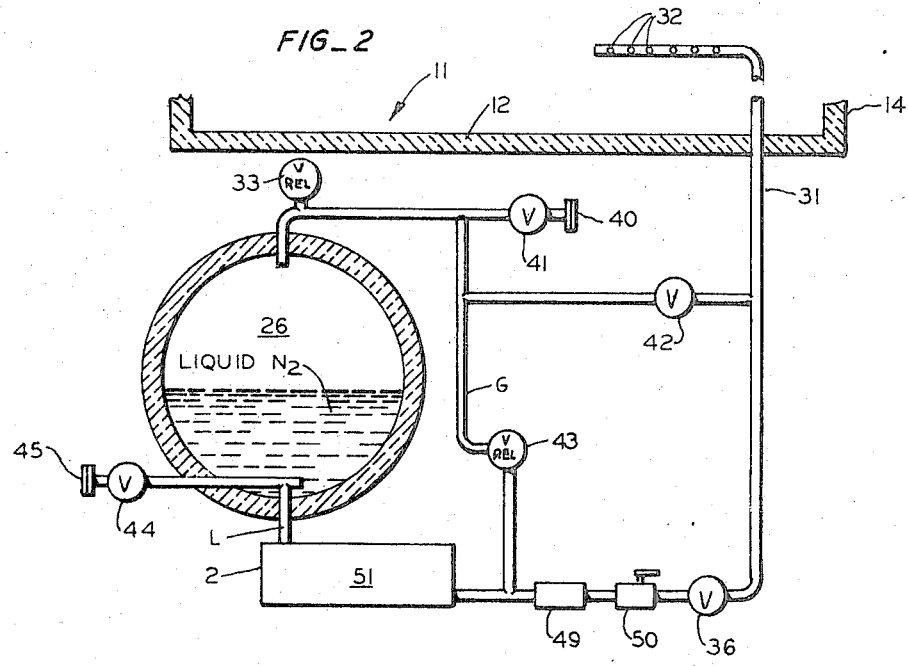
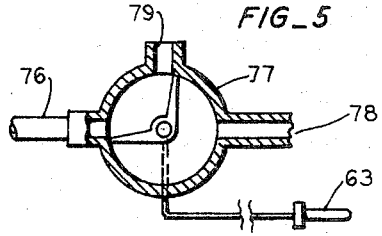
INVENTOR.
DAVID A. DIXON
BY
Julian Caplan
ATTORNEY

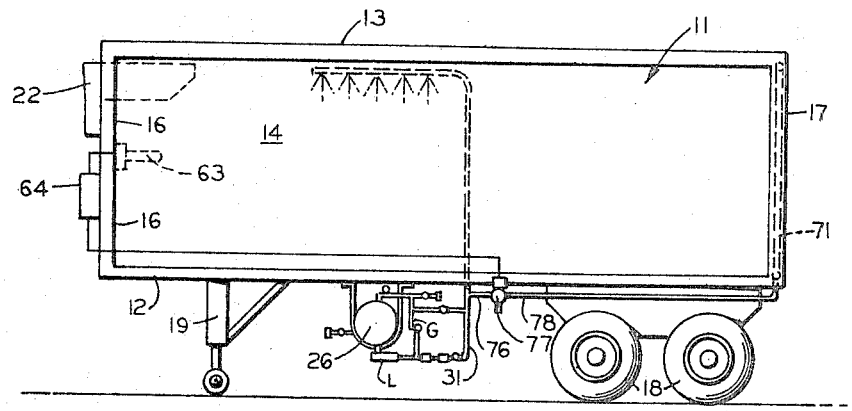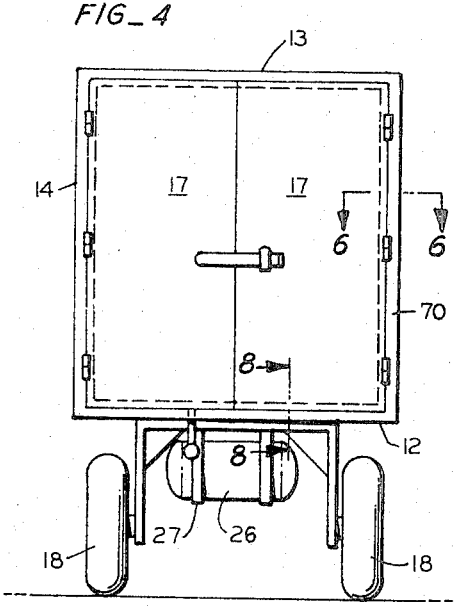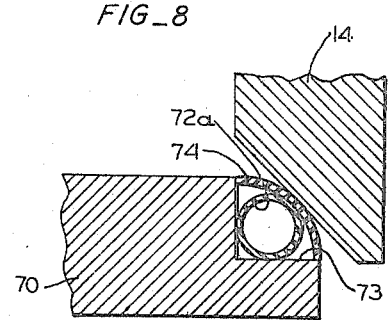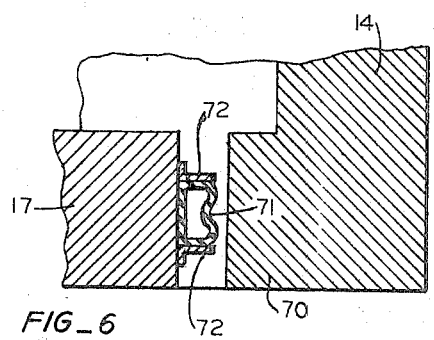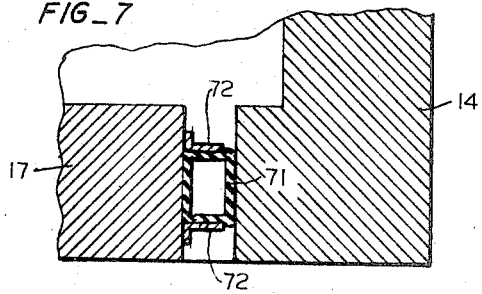

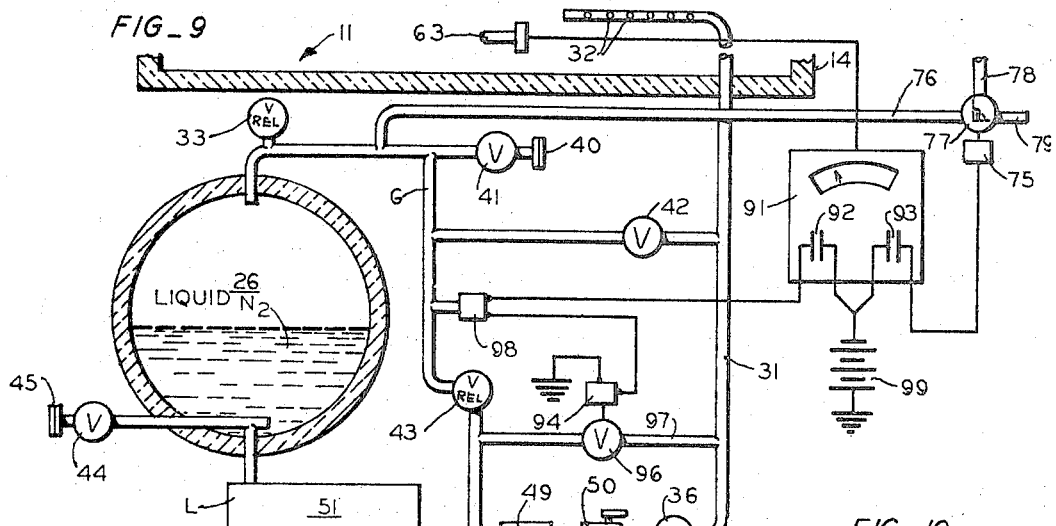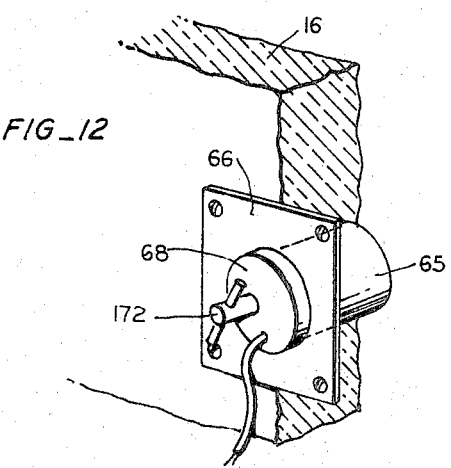

United States Patent Office 3,487,769
Patented Jan. 6, 1970

3,487,769
APPARATUS FOR CONTROLLED ADMISSION OF AIR TO CONTROLLED ATMOSPHERE
David A. Dixon, San Anselmo, Calif., assignor, by mesne assignments, to Occidental Petroleum Corporation, Los Angeles, Calif., a corporation of California
Continuation-in-part of application Ser. No. 356,624, Apr. 1, 1964. This application Apr. 26, 1965, Ser. No. 450,933
Int. Cl. A23l 3/00; A47j 47/02; A23b 7/00
U.S. Cl. 99—271                                    15 Claims

ABSTRACT OF THE DISCLOSURE

This invention relates to new and improved apparatus for controlling the oxygen concentration in a compartment by the controlled admission of an inert gas thereto and the admission of an oxygen-containing gas when the oxygen concentration falls below a predetermined level. The invention also relates to apparatus for providing refrigeration in the compartment, in conjunction with oxygen control, by the controlled admission of liquified inert gas.

---

This application is a continuation-in-part of copending application, Ser. No. 356,624, filed Apr. 1, 1964, now Patent No. 3,239,360.

A principal economic loss occurring during transportation of produce, such as fresh fruits and vegetables, is the degradation thereof which occurs between the field and the ultimate destination attributable to the effects of respiration. Heretofore, a conventional attempt to reduce such degradation is to refrigerate the produce to reduce the rate of respiration. One of the important problems which conventional refrigeration does not solve is the inherent time lag which occurs between the original receipt of the produce at its field temperature and the required reduced temperature. A substantial amount of the total degradation of produce occurs during this time lag. Accordingly, it is a principal object of the present invention to greatly decrease respiration during the time between the receipt of produce from the field and its reduction to the refrigeration temperature. This result is accomplished by purging the atmosphere in a refrigerator compartment with a large volume of nitrogen which diffuses throughout the refrigeration compartment, the containers for the produce, and even in the produce itself. The oxygen present in the atmosphere in the refrigerated compartment is therefore diluted and displaced and thus reduced to a level set between ½% to 4% as contrasted with a level of about 20% in the normal atmosphere. Reduction of the oxygen to a low level, such as ½% to 4%, greatly inhibits the rate of degradation of the produce.

Heretofore, other attempts have been made to inhibit initial degradation. One means heretofore employed is precooling the refrigerator compartment, but this requires a source of ice or large refrigeration equipment to accomplish precooling. Another attempt to reduce initial degradation has been vacuum cooling which is accomplished by evacuating the compartment, thereby evaporating a portion of the moisture present in the produce and thus reducing the temperature of the produce. Vacuum cooling, however, requires a centrally located vacuumizing plant. The expense of precooling and vacuum cooling plants and the inconvenience, cost, and delay in transporting the produce to such central plant is eliminated by the present invention.

Incidental to the reduction in the percentage of oxygen by reason of rapid evaporation of nitrogen within the refrigeration compartment is a refrigeration effect attributable to the heat of vaporization of the liquified gas. This reduces to a certain extent the workload of the mechanical or other refrigerator but this is not the primary purpose and effect of the emission of nitrogen into the refrigerating compartment. At the present time, one type of refrigeration is accomplished by evaporation of liquified nitrogen into the refrigeration compartment, the rate of introduction and vaporization being governed by temperature within the compartment as distinguished from the percentage of oxygen in the atmosphere as is the case in the present invention. Accordingly, conventional nitrogen refrigeration methods and apparatus do not accomplish the same results as in the present invention, namely, a precise control of the oxygen level.

The present invention also makes it possible to use a modification of conventional liquid nitrogen refrigeration methods and apparatus with fresh produce without causing anaerobic respiration to occur due to uncontrolled oxygen concentrations which are too low. Thus, the present invention provides controlled admission of air or oxygen into the compartment to overcome the tendency of the refrigeration nitrogen to lower the oxygen level to a degree likely to cause anaerobic degradation.

As hereinafter set forth in greater detail, after the initial reduction of oxygen where conventional mechanical refrigeration is employed, the compartment is purged with nitrogen gas and additional nitrogen is admitted to the compartment through an adjustable orifice so that the oxygen will ordinarily be at some set level in the range of between ½% to 4%, usually at about 2%, under normal operating conditions. The additional nitrogen introduced balances against leakages of outside air into the compartment through the walls and doors of the compartment and also balances the emission of traces of various gases which naturally are produced by and escape from the produce.

It is a feature of the present invention that variation in the oxygen level may be controlled by admission of air into the compartment under controlled conditions. Thus, in one form of the invention a duct is formed in the front wall of the compartment adjacent the refrigeration equipment and positioned so that air is normally introduced through the duct into the interior of the compartment due to a pressure difference between outside and inside or the duct may be in the floor. The duct is controlled by a valve. The valve in turn may be regulated by means of commercially available equipment which senses the percentage of oxygen in the compartment and regulates the air valve. Thus, additional nitrogen may be introduced through an orifice to more than balance against leakage, but the percentage of oxygen is maintained at some chosen level in the range of ½% to 4%, usually about 2%, by admitting air from the atmosphere. Instead of the duct opening into atmosphere, it may be connected to a source of compressed air or oxygen.

Alternatively, instead of locating a duct in the wall or floor of the compartment the control of oxygen may be maintained by opening and closing sealing means around the cargo loading doors. Hollow gaskets may be installed around the cargo doors and, when inflated, in effect hermetically seal the door to the door frame. When the gaskets are deflated, air will leak around the doors. The presence of pressurized nitrogen gas in the equipment, as above described, provides a means for inflating the gaskets since an auxiliary line may be connected into the nitrogen tank and a valve installed which will either pressurize the hollow gaskets or vent the same to the atmosphere. The oxygen sensing equipment heretofore mentioned may be used to control the valve which controls expansion or contraction of the gaskets. It will be understood, of course, that other means for inflating the gaskets may be used, such as compressed air from the air braking system of the vehicle, or a separate tank of compressed gas. In any event, the oxygen sensor is used to control the expansion and relaxation of the gaskets and thus control the admission of air into the compartment.

The use of very tight door gaskets, especially pneumatic ones, in conjunction with a purge-type atmosphere control system, may lead to two undesirable situations under certain conditions, such as when the system runs out of nitrogen prematurely, or when the van is sitting idle and unattended and unloaded:

(1) When the nitrogen runs out, $CO_2$ builds up in the compartment, as a product of respiration leading to extensive damage due to $CO_2$ poisoning of leafy vegetables in particular, since low oxygen conditions continue to exist and thus any $O_2$-controlled air entrance remains shut. By connecting the door gaskets to the nitrogen pressure in the tank, and by using pneumatic gaskets instead of very tight non-pneumatic ones, when the nitrogen is gone, the gaskets automatically leak, and hence regular air will again enter the compartment in quantity, allowing $CO_2$ to be swept out in turn.

(2) Door gaskets in accordance with this invention may be activated only when the nitrogen system is filled and certain valves turned on, thus when the trailer is at destination, or is unattended, the trailer does not pose a potential threat to passing children or others who might accidentally lock themselves in it and die from asphyxiation. In short, this invention provides a safety feature of no small consequence.

The set level of oxygen is preferably very precisely controlled at a certain percentage, which varies for different types of produce, but is generally in the range of 1% to 4%. For most produce the level is 2% to 2½% $O_2$, balance $N_2$. Equipment commercially available will control oxygen level within plus or minus 0.1% of set point under ideal conditions. Inaccuracies in the total system, such as rate of diffusion of $N_2$ and $O_2$, purge convection currents, and the like, reduce accuracy under dynamic conditions to plus or minus ½% of set point; under static conditions to plus or minus ¼%. Green produce at 2% $O_2$ has a respiration rate of one-sixth that at normal atmosphere as contrasted with a respiration rate of one-third normal at 4%. For soft fruits, 3½% $O_2$ is best and at 1% the danger of anaerobic respiration is great.

A feature of the invention is the fact that the oxygen level is not brought too low. If the oxygen in the atmosphere is below certain levels, usually 1%, anaerobic respiration accomplishes serious degradation of the produce. Accordingly, it is a principal purpose of the present invention to so accurately control the amount of oxygen in the atmosphere that degradation is minimized either from oxidation (i.e., respiration) of the produce or from anaerobic action. Although it has been stated that nitrogen is used in accordance with the present invention, it will further be understood that other inert gases of which argon is a typical example, may be substituted or mixed. The gases are usually transported in containers at low temperatures and low pressure in liquid state. An insulation is accomplished to reduce the tendency to evaporate. Such insulation may be accomplished by use of double-walled containers, such as Dewar flasks, or by thick layers of insulation.

With some produce, such as lettuce, which is relatively immune to damage from possible anaerobic respiration, oxygen level is sometimes controlled at some point set between 0% and 1%, since certain microorganisms such as molds, bacteria and decay-causing fungi will no grow in such an amosphere. Usually a further characteristic of such produce is that it is harmed by even trace amounts of carbon dioxide.

In transporting certain produce, of which typical examples are strawberries and apples, the degradation is further reduced by addition of carbon dioxide to the atmosphere. Accordingly, due to its inhibiting effect on the growth of certain microorganisms, it is contemplated in accordance with this invention that small quantities of carbon dioxide may be introduced in addition to the nitrogen and other inert gases.

A further important feature of the present invention is the refrigeration of the compartment during transportation so that the degradation of the produce is further inhibited. In a preferred form of the present invention, commercially available compressor-evaporator equipment is installed in the front end of the compartment, assuming the compartment is a trailer or truck, or in another convenient location. Operation of this equipment reduces the temperature of the compartment to a satisfactory level such as about 33° F. The capacity of conventional refrigeration equipment of this type for economic reasons is limited so that the temperature of the produce is not brought down immediately, but only after the passage of considrable time. Hence, the initial degradation heretofore described is not inhibited by this type of refrigeration equipment alone. In fact, due to the high rate of heat emission of warm produce, at field temperatures, such in-transit refrigeration equipment is incapable of cooling down produce loaded at field temperatures when respiration is allowed to proceed in a normal air atmosphere. In accordance with the present invention, the refrigeration equipment merely supplements the inhibition of degradation accomplished by oxygen displacement.

A feature and advantage of the present invention is the use of equipment permitting the gases to be carried in liquid form, thereby maintaining the weight and cost of the equipment at a minimum while providing enough gas capacity to emit the large quantities of gas initially required to purge the compartment, as well as to emit lesser quantities of gas over a prolonged period of time while the compartment is being transported to maintain the oxygen level low.

Another feature of the invention is the provision of an oxygen measuring and level-controlling device which is rugged and accurate. Such control may be powered by the gas pressure in the unit and supplemented by small batteries for electrical controls which have a long life. Thus, the equipment is essentially self-contained and there is considerable portability between different compartments.

In the preferred form of the apparatus hereinafter described, the equipment, and particularly the nitrogen tank, is carried externally to the refrigeration compartment and thus does not occupy cargo space. As a safety feature, the safety pressure valve of the nitrogen tank is preferably vented to the outside of the compartment, thereby reducing the extreme danger to personnel which arises when the tanks are transported inside the compartment and the oxygen level has been reduced below safe conditions for humans by escape of nitrogen through the pressure relief valve. A further safety feature is the use of an oxygen analyzer with a visible indicator gauge which warns if the compartment is below a safe oxygen level.

Another feature of the invention is the provision of a gas supply sufficient to purge the compartment together with control equipment for the emission of such gas which enables a proper atmosphere to be established very rapidly. Further, this system makes practical the use of the invention on substantially all existing produce-hauling trailers, containers and rail cars, without expensive modification, even though they have widely varying air leakage rates. Accordingly, the present invention can reduce the oxygen level set between ½% to 4% within a ten-minute period after the cargo has been loaded into the compartment and the doors closed. Hence, the decomposition of the produce occurs at full rate only during such ten-minute period and is therefore greatly inhibited. After the initial purging, the gas supply and the control equipment maintain the oxygen level carefully by a reduced flow of nitrogen and controlled air leakage. The equipment and controls are such that the ratio between the purge rate and the transportation rate of emission of the nitrogen is in the neighborhood of from 500 to 1.

The present invention improves the condition of produce after transportation. Where oxygen level is maintained in the range of ½% to 4%, and the temperature of the compartment is maintained at or near optimum for the produce being handled, the produce will stay fresh and edible as compared with conventional transportation methods. The rate of decline of sugar content, tenderness and fresh appearance is descreased. The market value and shelf life of the produce after delivery are enhanced. Perishable produce may be transported under conditions of up to 30° F. higher than optimum transport and storage levels presently prevailing for periods of up to one week without experiencing any more deleterious degradation due to respiration than occurs normally in air under optimum low temperature holding conditions. Accordingly, the present invention provides a cure for the major causes of loss of market value of produce between the field and the terminal market. The invention eliminates the need for many of the steps of rehandling now necessary between field and the beginning of transportation. It will be understood that much degradation takes place during such rehandling and hence the present invention has a further benefit in the market value of the produce.

Other objects of the present invention will become apparent upon reading the following specification and referring to the accompanying drawings in which similar characters of reference represent corresponding parts in each of the several views.

In the drawings:

FIG. 1 is a schematic side elevational view of a refrigerated highway semi-trailer in which the system of this invention is installed.

FIG. 2 is a piping diagram of the system of FIG. 1.

FIG. 3 is a view similar to FIG. 1 of a modification.

FIG. 4 is an end elevation of the structure of FIG. 3.

FIG. 5 is a fragmentary schematic section of a valve and associated structure of a portion of FIG. 4.

FIG. 6 is an enlarged sectional view substantially along line 6—6 of FIG. 4 showing the door sealing gasket relaxed.

FIG. 7 is a view similar to FIG. 6 showing the gasket inflated.

FIG. 8 is an enlarged sectional view substantially along line 8—8 of FIG. 4.

FIG. 9 is a view similar to FIG. 2 of another modification.

FIG. 10 is a view similar to FIG. 1 of still another modification.

FIG. 11 is an enlarged sectional view of the oxygen sensor mounting and adjacent structure.

FIG. 12 is a perspective view, partly broken away in section of the structure of FIG. 11.

The equipment illustrated in the accompanying drawings is schematic and is subject to considerable variation. Essentially there is provided a cargo compartment 11, having a floor 12, roof 13, sides 14, and front end 16. The rear end is prefearbly closed by doors 17, but doors may be located on the sides. Although compartment 11 may be stationary (as for storage) or may be in the form of a lift van, nevertheless, a common form of compartment is a trailer of the highway type having wheels 18 and a retractable support 19, and which may be moved by a tractor (not shown) or transported "piggy-back" on railway equipment, or "fishy-back" on ships. Preferably, the sides 14, ends 16, 17, floor 12, and roof 13, are insulated to reduce heat loss. Particularly where compartment 11 is a highway trailer, the preferred equipment uses a conventional highway-type refrigerator having a compressor and condenser 22 installed at the top of front end 16. It will be understood that other mechanical means may be used for refrigeration and other refrigeration means, such as ice or gas evaporation may be used.

Produce, such as crates 23 of fresh fruits and vegetables, is loaded into compartment 11 in normal manner and doors 17 are closed.

In accordance with the present invention, one or more tanks 26 of liquid nitrogen or mixtures of nitrogen and other gases, such as argon, are used. Tank 26 is supported by brackets 27 extending below floor 12, so that tank 26 extends transversely or longitudinally below floor 12. Tank 26 is, of course, pressure and shock resistant and for such purpose a Dewar flask is desirable or a metal container suitably insulated with polyurethane foam insulation. A pipe 31 runs from tank 26 into compartment 11, preferably to a central location near roof 13 and a plurality of spray holes 32 is formed in pipe 31 so that the liquid rapidly evaporates after emission or, if already in gaseous form, is evenly distributed. Tank 26 has a safety pressure relief valve 33 connected into its headspace which vents gaseous nitrogen to the outside when pressure exceeds a safe level for the strength of tank 26.

As shown in FIG. 2, tank 26 is filled through valve 44 with all other valves shut. Excess pressure will relieve through relief valve 33 only when tank pressure exceeds 60 p.s.i.g. Vent valve 41 and vent fitting 40 may be used to remove some or all gas from the system or allow faster filling. Before liquid will flow, pressure in tank 26 must be relieved to 20 p.s.i.g. by regulating valve 43. This valve 43 opens whenever pressure upstream exceeds 20 p.s.i.g. and closes whenever upstream pressure falls below 20 p.s.i.g.; its regulation is independent of downstream pressures, thus providing a true economizer circuit. Thus, until valve 43 closes, gas alone, from the tank headspace, will flow through tube G to valve 36; after pressure in the tank has been reduced to setting of valve 43, which is considered the working pressure of the system, and valve 43 closes, then liquid nitrogen flows through the tube L when so called for by the opening of valve 36 (see FIG. 10). Since constant evaporation of liquid nitrogen is occurring within tank 26 due to heat leak from the outside, this economizer circuit assures that vaporized gas will always be constructively utilized within the atmosphere control system rather than wasted through relief valve 33. Since in a moving, and thus sloshing tank, head space pressure will build up no faster than the entire bulk of liquid remaining in tank 26 can be brought to equilibrium condition regarding pressure and temperature, considerable "standby" time is possible with this economizer circuit, during which no gas will be lost by relief through valve 33.

If at the time that tank 26 is being filled with nitrogen, produce 23 has already been loaded into compartment 11 and doors 17 have been closed, purge valve 42 is opened instead of vent valve 41 during the filling period, and thus gas that would normally be lost during the filling process is utilized instead for the initial purge of compartment 11. When filling is completed valve 42 is closed and valve 36 controls thereafter.

Tank 26 can be filled through valve 41 and fitting 40 instead of valve 44 and fitting 45 if filling equipment of suitable pressure handling capability is available, and in this case valve 42 is left closed.

In the apparatus, as illustrated in FIGS. 2 and 9, off-on control valve 36 is installed in pipe 31 and all flow to distribution header 32 is in gaseous form. Flow is controlled by adjustable orifice 50 which is set to give a constant flow sufficient to keep the oxygen level slightly below set point in compartment 11; i.e., if 2½% $O_2$ is desired, orifice 50 is chosen to give a constant flow so that, under leakage conditions present when using the specific compartment, the oxygen level will be slightly below 2½%.

Initial purge is accomplished by opening purge valve 42 preferably during filling of tank 26, which filling is normally designed to take place after produce is loaded into compartment 11 and doors 17 closed. If, however, tank 26 has been filled in advance of loading the compartment and pressure in the tank has during the interim period of time built up to this pressure of the setting of relief valve 33, which is preferably at about 60 p.s.i.g., the rapid flashing or vaporizing of liquid nitrogen in tank 26 that takes place when the pressure is lowered by opening valve 42 will provide a rapid purge, albeit manually accomplished, of the compartment, with the expenditure of about 10% of the total capacity of tank 26.

A vaporizer circuit 51, consisting of tubing providing heat exchange between ambient air and liquid nitrogen, is used to insure that all nitrogen reaches orifice 50 in approximately the same gaseous condition. A strainer 49 protects orifice 50 against being plugged by foreign particles.

To accurately control the percentage of oxygen in compartment 11, the setting of orifice 50 is such that an excess of nitrogen will be valved into the compartment under normal operating conditions. In the form of the invention shown in FIG. 1, duct 61 is opened into the front end 16 of the trailer in proximity to the evaporator fan 22, so that as the trailer moves down the highway, or even if stationary, air is admitted into duct 61 due to pressure differential across the duct opening. It will be understood that duct 61 may be located in other positions (such as the floor 12) since its principal function is to admit air on demand. Located in duct 61 is a valve 62. An oxygen sensor 63, a commercially available type of equipment which is responsive to percentage of oxygen in the atmosphere to which it is subjected within narrow limits around some set point as shown by meter 64 within ½% to 4%, is mounted in the interior of the compartment. Sensor 63 may be a Beckman Polarographic oxygen analyzer, Model 764 (modified) as manufactured under Patent No. 2,913,386. By means of a relay (not shown), or directly through a mechanical or electrical solenoid connection, sensor 63 controls valve 62. Normally, valve 62 is closed and is opened only for a short period to admit oxygen.

A preferred detachable mounting of sensor 63 is shown in FIGS. 11 and 12. It is frequently desirable to remove sensor 63 for inspection, renewal or repair without access to the interior of compartment 11. A hole is formed in wall 16 (or other appropriate location) and lined with tube 65 of stainless steel or other suitable material made airtight by face plate 66 attached to wall 16. Sensor 63 slips inside tube 65 and is stopped by a plastic sleeve 67. The electrical connections for sensor 63 pass outside through tube 65. The outer end of tube 65 is provided with cover 68 having on its inside a cylindrical, bellows-type, rubber compression gasket 69 fitting inside tube 65. Plate 70 closes off the inner end of gasket 69 and is provided with a threaded stem 171 which passes through cover 68 and is received in nut 172 which serves as a handle. After sensor 63 is installed, cover 68 is put in place and nut 172 turned, drawing plate 70 outward and thus compressing gasket 69 so that cover 68 is sealed to tube 65. When it is necessary to obtain access to sensor 63, nut 172 is turned in the opposite direction, cover 68 removed, and sensor 63 withdrawn.

It will be understood that nitrogen tank 26 may be mounted inside the compartment and that the nitrogen emission control equipment may be installed on the top of the tank itself as a self-contained unit which may be installed and removed rapidly. Patent application Ser. No. 356,624 illustrates and describes how this may be accomplished.

Control equipment by which sensor 63 regulates valve 62 may be actuated by a battery, by a plug into the vehicle electrical system, by a combination of a small battery and pneumatic operation pressured by the gas in container 26, or by a mechanical linkage between the oxygen sensor and the valve. Where electrical means is used, a relay (not shown) is preferably used.

At the commencement of operation, compartment 11 is filled with normal air which has an oxygen percentage of about 20%. The temperature of compartment 11 is that of the surrounding air or field temperature which is here assumed to be 80° F. It is also assumed that the temperature of the cargo 23 of produce which is loaded into compartment 11 is at field temperature. This condition is shown in FIG. 1. After loading, doors 17 are closed.

After the produce has been loaded, the compartment is purged by opening valve 42 which emits into the compartment a large volume of nitrogen as a gas or a liquid which rapidly vaporizes into gas and which amount of gas is approximately seven or eight times the total volume of remaining air space in the compartment. The nitrogen rapidly diffuses throughout the compartment, containers 23 for the produce, and into the produce itself. It will be noted that this is a diffusing action and that convection is not essential to the operation. The emission of such a large initial volume of nitrogen into the compartment "purges" the atmosphere of air by dilution and expulsion, bringing the oxygen content down to the desired set point between ½% to 4%. Preferably, this is accomplished within a time period of about ten minutes. Vaporization of such a large quantity of liquified nitrogen accomplishes a certain amount of refrigeration of the compartment, but because such refrigeration is incidental to the main purpose of the purging of the air by the emission of nitrogen, the temperature may be field temperature although the temperature would actually be lower.

After the purging of the compartment, oxidation of the produce due to respiration is greatly reduced and hence the rapid loss of quality of the produce through such degradation is limited to the time period of purging, which is always sufficiently short that no commercial value is lost.

After the initial purging of the compartment, compartment 11 may be transported long distances, either by tractor 21 or by railway equipment, or other means heretofore mentioned. Preferably during such transportation, mechanical refrigeration equipment 22 is operated which reduces the temperature inside compartment 11 to a material extent. A cargo temperature range of 33° to 35° is very suitable for most products and this is usually attained over a period of 12 to 72 hours.

Some products, such as lettuce, give longest market shelf life if carried at higher temperature, such as 60° F. Precooled loads also can be loaded, and such condition is preferred when handling soft fruits.

Desirable temperatures for transportation or storage are set forth in the following U.S. Department of Agriculture Handbooks:

No. 66—"The Commercial Storage of Fruits, Vegetables, and Florist and Nursery Stock" (1954)

No. 195—"Protection of Rail Shipments of Fruits and Vegetables" (1961)

No. 105—"Protecting Perishable Foods During Transportation" (1956).

Ice can be the additional refrigerant and in many cases today, particularly when compartment 11 is a railway car, ice is still used to refrigerate produce in transit. When the atmosphere control device is used in conjunction with the ice refrigeration, two of the great disadvantages of ice refrigeration are overcome: (1) Much less ice is used, since in the usual produce haul the heat of respiration, even of a precooled load of produce, is often three to six times that of the heat that comes in through the walls of the container due to heat transmission from ouside ambient conditions or sun's radiation, and (2) the corallary effect—that of having to stop a train nightly for reicing—is avoided, since one loading of ice at destination will hold the load and handle the remaining refrigeration load all the way to destination. It can be seen that the effect of (1) is that of greatly decreased cost, since the cost of ice is quite high today compared to what it was when ice cars were first developed; the effect of (2) is not only the inherently lesser cost of using less ice but also the tangible and considerable saving accomplished by not having to stop a train every night of a six-day journey to spend three to six hours reicing all of the cars.

As transportation or storage of the produce continues, certain gases are emitted by the produce which reduce the percentage of oxygen. Furthermore, it is desirable that the setting of orifice 50 be such that excess nitrogen is emitted. When oxygen sensor 63 senses that the presence of oxygen is below set point, valve 62 is opened, admitting air into compartment 11 to diffuse into the atmosphere and bringing the oxygen level to the desired range. Sensor 63 maintains the oxygen level high enough so as to inhibit anaerobic degradation of the produce. The quantity of oxygen normally admitted in this manner after initial purging is relatively small. Further, the quantity of nitrogen normally required to bring the oxygen level down is also relatively small and hence a tank 26 of liquified nitrogen or other inert gas will satisfy all normal requirements for transportation for long distances and over long periods of time, such as several weeks.

Where desirable, a separate tank (not shown) of gas such as carbon dioxide may be installed and its emission controlled by a carbon dioxide sensor controlling the valve in the $CO_2$ line to maintain the proper amount of gas in compartment 11 for those varieties of produce for which the presence of such gas is desirable, such as soft tree fruits (e.g., peaches), strawberries and some other products. $CO_2$ for such products is maintained at some set point in the range of 3% to 15%.

When the cargo has reached its destination, it will be found that its condition is far superior to that of other means of transportation. Transportation over a two-week period under these conditions is very satisfactory and more prolonged periods are likewise commercially feasible.

The term "liquified nitrogen" has been used herein in a generic sense. It will be understood that other gases inert to produce or mixtures may be used. Liquified gases are transported most economically and conveniently and vaporization thereof adds to the effectiveness of the refrigeration system. However, gases in non-liquid form may be used in the system. The term "field temperature" is used to mean the temperature at which produce is harvested or a temperature substantially above the desirable temperatures for transportation and storage as defined in the above-cited Department of Agriculture Handbooks.

An alternate system is shown in FIGS. 3 to 5. It will be understood that modern refrigeration truck equipment is substantially airtight, except for the leakage of air around the doors 17. An expandable tubular gasket 71 of rubber or similar material is installed on doors 17, abutting the edge of door frame 70 and preferably protected by metal flanges 72 which prevent the closing of the door from pinching the tubing or loading of cargo from damaging the same. An alternate arrangement is shown in FIG. 8 wherein a rabbet 73 is formed in door frame 70 to receive gasket 71a. The gasket is protected by an overlying flap 74. The tubes 71, 71a may be inflated or deflated, and when inflated seal against door frame 70 and substantially prevent the admission of air. Comparison of FIGS. 6 and 7 shows how inflation seals the door and the solid and dotted line positions of FIG. 8 illustrate the same function. Various means may be employed to inflate and deflate tubes 71, 71a. In a preferred form of the invention, a branch line 76 is drawn off from nitrogen line G to a three-way valve 77 and thence to gaskets 71 or 71a via pipe 78. In one position of valve 77, nitrogen pressure inflates gaskets 71, through tubing 78 and in another position of the valve supply line 76 is sealed and tubing 78 is vented to atmosphere via outlet 79 and hence deflated. Valve 77 may be controlled by oxygen sensor 63 either mechanically or electrically. In other words, when the oxygen level in compartment 11 is too low, valve 77 is shifted to interconnect line 76 with vent 79 to deflate the gaskets and air leaks around the door frame, but at other times, lines 76 and 78 are interconnected and the gaskets are inflated and the door frame is sealed.

It will be understood that other sources of pressurized gas for the control of the gaskets may be used, such as tanks of compressed air or the compressed air braking system of the trailer.

Turning now to FIG. 9, a modification of the structure previously defined is illustrated. Many of the elements of the structure of FIG. 9 are similar or identical with those shown in the preceding modification and the same reference numerals are used to designate corresponding parts. Oxygen sensor 63 is connected to a control meter 91, having both high level and low level contacts 92, 93, respectively. When sensor 63 senses a deficiency in the amount of oxygen in compartment 11, contacts 93 are closed, actuated solenoid 75 governing valve 77 to close communication with tank 26 and vent through vent 79 and deflate the door gaskets (not shown), as in the preceding modification, or open a vent similar to vent 61 in FIG. 1 admitting air or oxygen to the interior of the compartment. On the other hand, if sensor 63 senses an excessive amount of oxygen, contacts 92 are closed which energizes solenoid 94, controlling valve 96 in by-pass line 97, intercommunicating between line G and line 31 around orifice 50, and admitting additional nitrogen to compartment 11 regardless of the setting of orifice 50.

FIG. 9 also illustrates a safety device which may be used in this modification as well as other forms of the invention using a solenoid controlled valve such as valve 96. In this form of the invention, a pressure-sensitive switch 98 is connected into line G and set at about 5 p.s.i.g. Switch 98 is installed in the line between control 91 and solenoid 94. When the pressure in line G (and hence in tank 26) is less than 5 p.s.i.g., switch 98 is opened and hence when contacts 92 are closed the energization of solenoid 94 is interrupted. Preferably, switch 98 is designed to shut off all electrical power to the oxygen level control, solenoid, pilot lights, etc. whenever the pressure of the system falls below five pounds. Were it not for switch 98, when the tank 26 is exhausted, the sensor 63 would continuously call for additional nitrogen and this would mean the solenoid 94 would be continuously energized and hence damaged. Further, the battery 99 energizing the circuit would be exhausted. Switch 98 prevents these occurrences.

In the form of the invention shown in FIG. 10, refrigeration of compartment 11 is accomplished by evaporation of liquid nitrogen sprayed into the compartment through header 32. The presence of a large amount of nitrogen in the compartment reduces the oxygen content by diffusion, frequently below a safe level if the compartment is sealed and the outside temperature is moderate or high. Accordingly, the present invention may be used to control the level of oxygen by admitting outside air or compressed air or oxygen to prevent anaerobic degradation of the produce.

In the form of the invention shown in FIG. 10, many of the elements are similar to those in the preceding modification and the same reference numerals are used to designate corresponding parts. In this form of the invention, thermostat 101 is installed in compartment 11 and connected to thermostat control 102. When the temperature rises above a predetermined level, control 102 closes energizing solenoid 103 and opening valve 36, thereby admitting liquid nitrogen to header 32. Evaporation of nitrogen reduces the temperature in compartment 11 and when the desired temperature is reached thermostat 102 causes the valve 36 to close. The admission of nitrogen reduces the oxygen content. When sensor 63 senses that the percentage of oxygen is below a predetermined amount, it operates through control 64 to change the setting of valve 77. Ordinarily the gaskets 71 or 72a on doors 17 of the compartment are sealed by valve 77 being turned in such manner that gas from tank 26 inflates the gaskets. However, the change in setting of valve 77 occasioned by oxygen sensor 63 sensing deficiency of oxygen vents valve 77, deflating gaskets 71 or 72a, and allowing atmosphere to leak through doors 17 and increase the oxygen content in compartment 11.

An alternate or supplement means to deflation of the door gaskets is shown in FIG. 10. In this form of the invention vent 61a is formed in floor 12, or other location in compartment 11, and has a valve 62a installed therein. Sensor control 64 may energize solenoid 106 to change the setting of valve 62a to admit air to compartment 11. It will further be understood that duct 61a may be connected to a source of compressed air or oxygen if desired. Use of a source of compressed air or oxygen instead of atmosphere is advantageous because admitting a relatively large quantity of warm atmosphere increases the amount of refrigeration required to maintain the compartment at a desired low temperature.

What is claimed is:

1. Apparatus for controlling the oxygen concentration in the atmosphere in a compartment means having door means and gas admission means operable to permit admission of gases thereinto, comprising:
   inert gas material source storage means,
   operating control means operatively connected to said gas admission means to cause said gas admission means to permit admission of oxygen-containing gas into said compartment means when the percentage of oxygen in said atmosphere in said compartment means is below a predetermined amount and to prevent the admission of oxygen-containing gas into said compartment means when the percentage of oxygen in said atmosphere in said compartment means is above a predetermined amount,
   conduit means to connect the interior of said source storage means with the interior of said compartment means, said conduit means having:
      flow control means therein, and
      controlled valve conduit means connected in parallel with said flow control means.

2. Apparatus for controlling the oxygen concentration in the atmosphere in a compartment means having door means and gas admission means operable to permit admission of gases thereinto, comprising:
   inert gas material source storage means,
   conduit means to connect the interior of said source storage means with the interior of said compartment means,
   sensor means to sense the percentage of oxygen in said atmosphere in said compartment means,
   control means responsive to said sensor means and operatively connected to said gas admission means to cause said gas admission means to permit admission of oxygen-containing gas into said compartment means when said sensor means senses that the percentage of oxygen in said atmosphere in said compartment means is below a predetermined amount and to prevent the admission of oxygen-containing gas into said compartment means when said sensor means senses that the percentage of oxygen in said atmosphere in said compartment means is above said predetermined amount.

3. The apparatus of claim 2 wherein said conduit means has flow control means therein.

4. The apparatus of claim 2 wherein said conduit means has a controller-valve means therein responsive to said sensor means whereby said valve means in said controller-valve means is actuated to permit admission of inert gas to said compartment means when said sensor means senses a percentage of oxygen in said compartment means above a predetermined amount and to prevent the admission of said inert gas to said compartment means when said sensor means senses a percentage of oxygen in said atmosphere in said compartment means below a predetermined amount.

5. The apparatus of claim 4 comprising, in addition: flow control means in said conduit means connected in parallel with said valve of said controller-valve means, to provide for a predetermined rate of flow of said inert gas to said compartment means.

6. The apparatus of claim 4 comprising, in addition:
   temperature sensing means to sense the temperature in said compartment means, and
   temperature controller means responsive to said temperature sensing means and operatively connected to control said valve means in said conduit means to admit liquified inert gas to said compartment means to refrigerate same when the temperature in said compartment means exceeds a predetermined level, and to discontinue said admission of said liquified inert gas when said temperature is below a predetermined level.

7. The apparatus of claim 4 comprising, in addition: pressure switch means responsive to the pressure in said storage means, in said controller-valve means, said pressure switch means being opened when the pressure in said storage means falls below a selected value, interrupting actuation of said valve means.

8. Apparatus for controlling the oxygen concentration in the atmosphere in a compartment means comprising:
   compartment means having door means,
   gas admission means in said compartment means operable to permit admission of gases thereinto,
   inert gas material source storage means,
   conduit means to connect the interior of said source storage means with the interior of said compartment means,
   sensor means to sense the percentage of oxygen in said atmosphere in said compartment means,
   control means responsive to said sensor means and operatively connected to said gas admission means to cause said gas admission means to permit admission of oxygen-containing gas into said compartment means when said sensor means senses that the percentage of oxygen in said atmosphere in said compartment means is below a predetermined amount and to prevent the admission of oxygen-containing gas into said compartment means when said sensor means senses that the percentage of oxygen in said atmosphere in said compartment means is above said predetermined amount.

9. The apparatus of claim 8 wherein said conduit means has a controller-valve means therein responsive to said sensor means whereby said valve means in said controller-valve means is actuated to permit admission of inert gas to said compartment means when said sensor means senses a percentage of oxygen in said compartment means above a predetermined amount and to prevent the admission of said inert gas to said compartment means when said sensor means senses a percentage of oxygen in said atmosphere in said compartment means below a predetermined amount.

10. The apparatus of claim 9 comprising, in addition: flow control means in said conduit means connected in parallel with said valve of said controller-valve means, to provide for a predetermined rate of flow of said inert gas to said compartment means.

11. The apparatus of claim 9 comprising, in addition:
   temperature sensing means to sense the temperature in said compartment means, and
   temperature controller means responsive to said temperature sensing means and operatively connected to control said valve means in said conduit means to admit liquified inert gas to said compartment means to refrigerate same when the temperature in said compartment means exceeds a predetermined level, and to discontinue said admission of said liquified inert gas when said temperature is below a predetermined level.

12. The apparatus of claim 9 comprising, in addition: sensor mounting means mounted in and defining an opening through a wall of said compartment means and having an inner end on the inside of said compartment means and an outer end on the outside of said compartment means, said sensor means being removably mounted in said sensor mounting means, gasket means disposed in said mounting means between said outer end thereof and said sensor means mounted therein, and means operable from the exterior of said compartment means to expand said gasket means and seal said sensor mounting means.

13. The apparatus of claim 8 wherein said gas admission means comprises:

opening defining means in said compartment means to permit oxygen-containing atmosphere to enter the interior of said compartment means, and inflatable means in said opening defining means which upon being inflated seal said opening defining means and prevent admission of said oxygen-containing atmosphere into said compartment means, and upon being deflated, permits admission of said oxygen-containing atmosphere into said compartment means.

14. The apparatus of claim 13 whereby said opening defining means comprises said door means and framework in said compartment means around said door means forming an opening therebetween.

15. The apparatus of claim 13 comprising, in addition:

inflating conduit means connecting said source storage means to said inflatable means, controller-valve vent means responsive to said sensor means in said inflating conduit means, to permit the flow of inert gas from said source storage means to said inflatable means to inflate same when said sensor means senses a percentage of oxygen in said atmosphere above a predetermined amount, and to prevent the flow of inert gas from said source storage means to said inflatable means and to vent said inflatable means when said sensor means senses a percentage of said oxygen below a predetermined amount.

References Cited

UNITED STATES PATENTS

| 2,179,327 | 11/1939 | Evans | 99—269 |
| 2,583,697 | 1/1952 | Hendry | 99—189 |
| 2,955,940 | 10/1960 | Williams | 99—154 |
| 3,096,181 | 7/1963 | Dixon et al. | 99—269 X |
| 3,107,171 | 10/1963 | Robinson | 99—154 |

ROBERT W. JENKINS, Primary Examiner

U.S. Cl. X.R.

99—189, 193